US012809395B2

(12) United States Patent
Bo et al.

(10) Patent No.: US 12,809,395 B2
(45) Date of Patent: Nov. 24, 2026

(54) SYSTEM FOR DETERMINING CARBON EMISSION VALUE OF TARGET AIRCRAFT

(71) Applicant: Travelsky Mobile Technology Limited, Beijing (CN)

(72) Inventors: Manhui Bo, Beijing (CN); Lei Bian, Beijing (CN); Yu Bo, Beijing (CN); Luyao Zhang, Beijing (CN); Ye Gong, Beijing (CN); Sen Huang, Beijing (CN)

(73) Assignee: TRAVELSKY MOBILE TECHNOLOGY LIMITED, Beijing (CN)

( * ) Notice: Subject to any disclaimer, the term of this patent is extended or adjusted under 35 U.S.C. 154(b) by 0 days.

(21) Appl. No.: 19/144,840

(22) PCT Filed: Mar. 31, 2025

(86) PCT No.: PCT/CN2025/086323

§ 371 (c)(1),
(2) Date: Jun. 30, 2025

(87) PCT Pub. No.: WO2026/123505

PCT Pub. Date: Jun. 18, 2026

(65) Prior Publication Data

US 2026/0161173 A1 Jun. 11, 2026

(30) Foreign Application Priority Data

Dec. 9, 2024 (CN) ......................... 202411796588.6

(51) Int. Cl.
*G05D 1/644* (2024.01)
*G05D 109/20* (2024.01)

(52) U.S. Cl.
CPC ......... *G05D 1/644* (2024.01); *G05D 2109/20* (2024.01)

(58) Field of Classification Search
CPC ............... G05D 1/644; G05D 2109/20; B64U 2201/00; B64U 20/00; B64C 39/024; B64C 39/00
(Continued)

(56) References Cited

U.S. PATENT DOCUMENTS 9,718,562 B1 * 8/2017 Fisher ........................ F02C 9/00
12,494,131 B1 * 12/2025 Daniels, Jr. .............. G08G 5/21
(Continued)

FOREIGN PATENT DOCUMENTS

CN 113642864 A 11/2021
CN 113984075 A 1/2022
(Continued)

*Primary Examiner* — Tuan C To
(74) *Attorney, Agent, or Firm* — MUNCY, GEISSLER, OLDS & LOWE, P.C.

(57) ABSTRACT

The present invention provides a system for determining a carbon emission value of a target aircraft, relating to the technical field of determining carbon emission values of aircrafts. The system includes steps of: obtaining a flight time-length T of the target aircraft on the target flight path, a take-off weight of the target aircraft, and a flight altitude and a flight speed of the target aircraft in a level flight stage of the target flight path; and according to the type of the target aircraft, determining a carbon emission calculation weight corresponding to the target aircraft from a preset carbon emission calculation weight mapping table, to determine the carbon emission values, and then obtain the carbon emission value corresponding to the target aircraft. The present invention makes it possible to determine a more accurate carbon emission value corresponding to the target aircraft flying along the target flight path.

7 Claims, 5 Drawing Sheets

(58) Field of Classification Search
USPC .............................................................. 701/4
See application file for complete search history.

(56) References Cited

U.S. PATENT DOCUMENTS

| | | | | |
|---|---|---|---|---|
| 2015/0066253 | A1* | 3/2015 | Hayes | B64C 19/00 701/3 |
| 2018/0240348 | A1 | 8/2018 | Ren | |
| 2024/0370805 | A1* | 11/2024 | Schulze | G06Q 10/06375 |
| 2024/0409238 | A1* | 12/2024 | Zhang | G06Q 10/08 |
| 2025/0368341 | A1* | 12/2025 | Subramonian | B64D 31/06 |
| 2026/0006661 | A1* | 1/2026 | Janakiraman | H04W 76/15 |
| 2026/0048854 | A1* | 2/2026 | Kudva | B64D 43/00 |

FOREIGN PATENT DOCUMENTS

| | | | | |
|---|---|---|---|---|
| CN | 114118537 | A | 3/2022 | |
| CN | 115470993 | A | 12/2022 | |
| CN | 116679011 | A | 9/2023 | |
| CN | 117668440 | A | 3/2024 | |
| CN | 118277701 | A | 7/2024 | |
| CN | 119271677 | A | 1/2025 | |
| JP | 7375255 | B1 | 11/2023 | |
| WO | WO-2022079435 | A1 * | 4/2022 | B64D 37/04 |
| WO | WO-2024020334 | A1 * | 1/2024 | G06T 11/26 |

* cited by examiner

SYSTEM FOR DETERMINING CARBON EMISSION VALUE OF TARGET AIRCRAFT

FIELD OF THE INVENTION

The present invention relates to the technical field of determining carbon emission values of aircrafts, in particular to a system for determining a carbon emission value of a target aircraft.

BACKGROUND OF THE INVENTION

In the context of the global climate crisis, it has become very important to achieve low-carbon aviation flights, which are therefore based on how to accurately calculate carbon emission values caused by aircraft flights; In the prior art, it is usual to calculate a carbon emission value caused by an aircraft flight according to the distance traveled by the aircraft; However, for various types existing in aircrafts, the factors such as weight and engine parameters differing in different types of aircrafts, and a diversity of flight states corresponding to the same flight path will lead to a big diversity of carbon emission values of the aircrafts flying the same distance. If only a flight distance is correspondingly used to determine a carbon emission value, it will bring about lower accuracy of a determined carbon emission value.

SUMMARY OF THE INVENTION

The invention provides a system for determining a carbon emission value of a target aircraft so as to solve the technical problem that the accuracy of carbon emission values determined in the prior art is low.

The system for determining a carbon emission value of a target aircraft provided by the present invention comprises a processor and a storage medium, wherein the storage medium stores at least one instruction or at least a segment of program, which are processed and executed by the processor, so as to effectuate the steps of

S100 obtaining a target flight path, defined as any past flight path corresponding to a target aircraft;

S200 obtaining a flight time-length T of the target aircraft on the target flight path, a take-off weight M of the target aircraft, and a flight altitude H and a flight speed V of the target aircraft in a level flight stage of the target flight path;

S300 according to the type of the target aircraft, determining a carbon emission calculation weight corresponding to the target aircraft from a preset carbon emission calculation weight mapping table, which includes different several types of aircrafts and carbon emission calculation weights corresponding to each type of aircrafts;

S400 if a computing capacity of a target device, which is used to calculate carbon emission values generated by the target aircraft flying along the target flight path, is bigger than a preset computing capacity threshold, determining a carbon emission value $Q_1$ in a take-off stage, a carbon emission value $Q_2$ in a level flight stage and a carbon emission value $Q_3$ in a landing stage of the target aircraft on the target flight path according to T, M, H, V and calculation weights corresponding to the target aircraft; and

S500 on the base of $Q_1$, $Q_2$ and $Q_3$, determining a carbon emission value $Q=Q_1+Q_2+Q_3$ corresponding to the target aircraft flying along the target flight path, Q being positively correlated with M, V and T, and negatively correlated with H.

The present invention has at least the following beneficial effects.

With respect to the system for determining a carbon emission value of a target aircraft provided by the present invention, by way of obtaining a flight time-length T of the target aircraft on the target flight path, a take-off weight M of the target aircraft, and a flight altitude H and a flight speed V of the target aircraft in a level flight stage of the target flight path; and according to the type of the target aircraft, determining a carbon emission calculation weight corresponding to the target aircraft from a preset carbon emission calculation weight mapping table, it is possible to determine the carbon emission values of the take-off stage, the level flight stage and the landing stage, and then obtain the carbon emission value corresponding to the target aircraft flying along the target flight path. The present invention takes into overall consideration the flight time-length of the target aircraft flying along the target flight path, the take-off weight of the target aircraft, the flight altitude and the flight speed of the target aircraft in the level flight stage of the target flight path, at the time of determining the carbon emission value corresponding to the target aircraft flying along the target flight path. In addition, by way of using the carbon emission calculation weights corresponding to different types of aircrafts flying on the same route are different, it is possible to determine a more accurate carbon emission value corresponding to the target aircraft flying along the target flight path.

Furthermore, in the prior art, because calculating the carbon emission value on the base of a fixed flight path needs to combine few factors, that gives an inaccurate result; while calculating the carbon emission value on the base of flight track points requires a bigger computing capacity. The method of the present invention consists in dividing the flight path into three stages for calculation, compared with the mode of calculating the carbon emission value on the base of a fixed flight path in the prior art, it can give a more accurate result, compared with the mode of calculating the carbon emission value on the base of flight track points, it requires a smaller computing capacity for calculating carbon emission values, therefore, on the basis of ensuring the accuracy of carbon emission calculation, the present invention has advantages of saving computing capacities and widening its use.

The sole FIGURE is a flow chart of the steps executed by the processor of the system for determining a carbon emission value of a target aircraft provided by the embodiments of the present invention.

DETAILED DESCRIPTION OF SOME EMBODIMENTS

The technical solutions in the embodiments of the present application will be clearly and completely described below, and it is obvious that the described embodiments are only part of the embodiments of the present application, not all embodiments. Based on the embodiments in the present invention, all other embodiments obtained by a person skilled in the art without doing creative work fall within the protection scope of the present invention.

It should be noted that the following description is intended to illustrate the present invention rather than pose a limitation on it by providing specific details such as specific system structures and technologies, so as to thoroughly understand the embodiments of the present invention. However, a person skilled in the art should be aware that the present invention can also be conceived in other embodiments that do not have these specific details. In other cases, omitting the detailed description to well-known systems, devices, circuits and methods makes it avoidable to hinder the description to the present invention with unnecessary details.

It should be understood that, the term "comprising" used in the description of the present invention and the claims indicates the existence of the described features, entireties, steps, operations, parts and/or components, but does not exclude the existence or addition of one or more other features, entireties, steps, operations, parts, components and/or assembles. It should also be understood that the term "and/or" in the description of the present invention and the claims refers to any combination and all possible combinations of one or more of the items listed in correlation and includes such combinations.

In the description of the present invention and the claims, the term "if" may be construed as "in the case of", or "when", or "once", or "in response to the determination that" or "in response to the detection that". Similarly, the phrases "if determined" or "if detected [a described condition or event]" may be construed as "once determined", or "in response to the determination that", or "once detected [a described condition or event]", or "in response to the detection that [a described condition or event]".

In the description of the present invention and the claims, the terms "first", "second", "third", etc., are used only to distinguish descriptions and should not be construed as indicating or implying relative importance, nor used to describe a particular order or sequence.

Figure 1A:
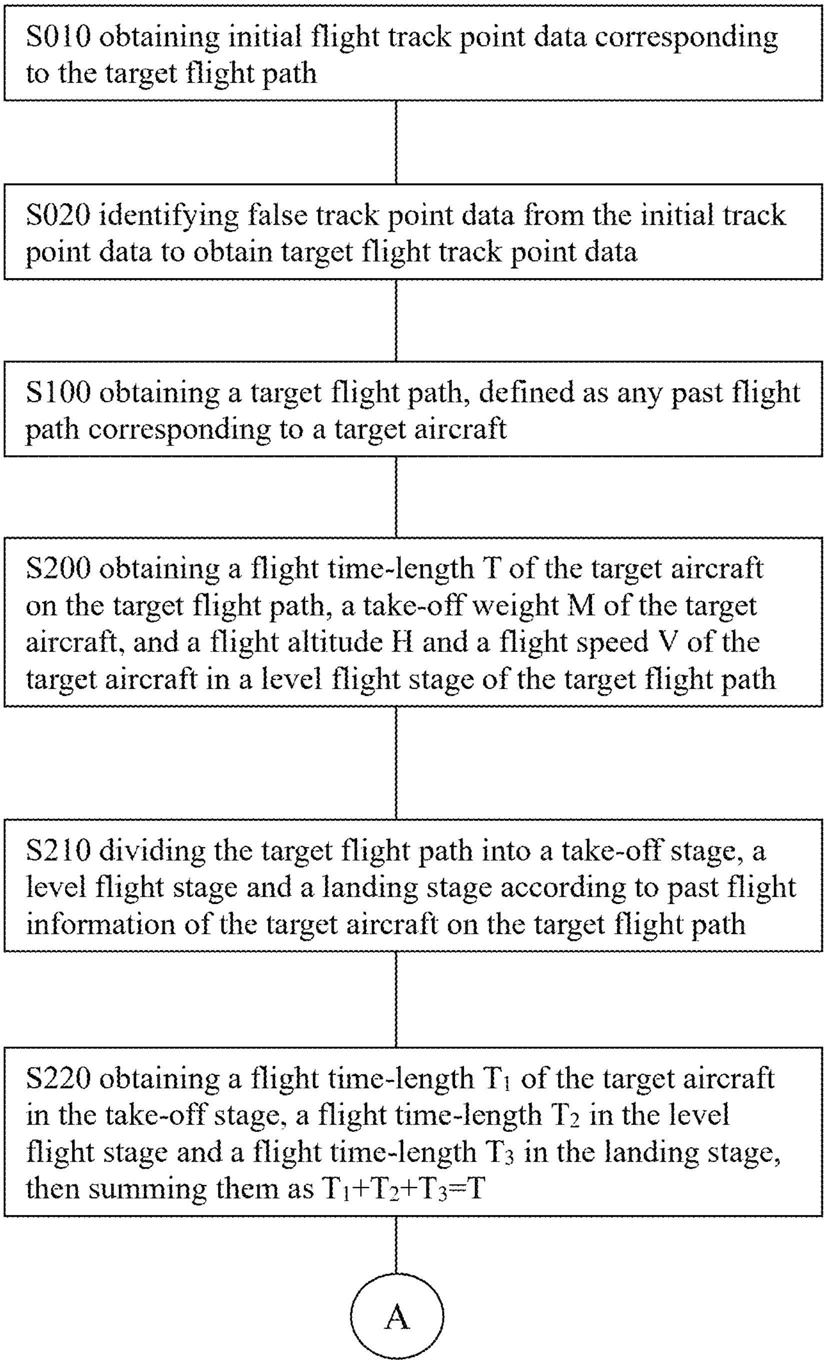
FIGS. 1A, 1B, 2, 3A and 3B are flow charts of the steps executed by the processor of the system for determining a carbon emission value of a target aircraft provided by the embodiments of the present invention.
Figure 1B:
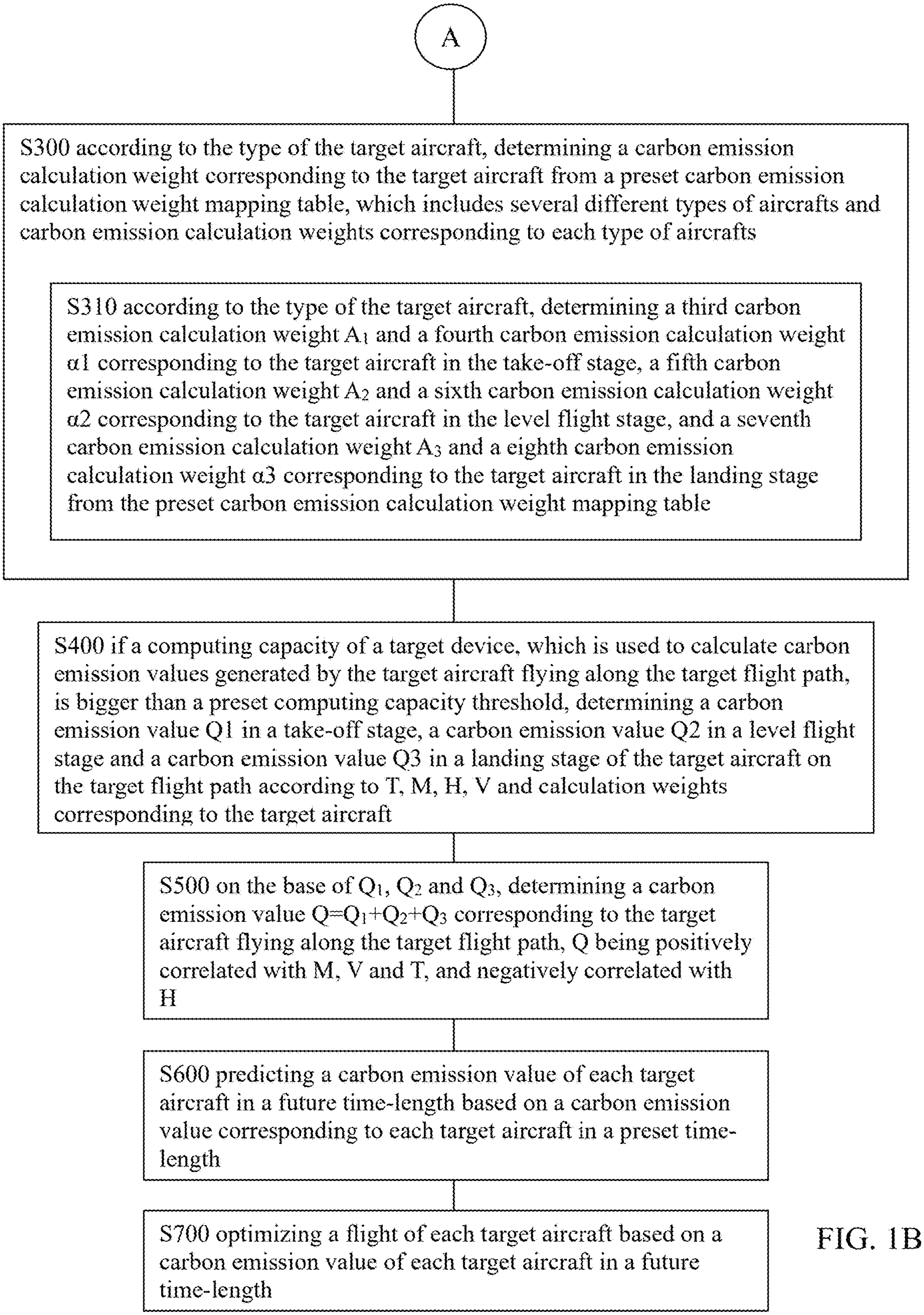
Figure 2:
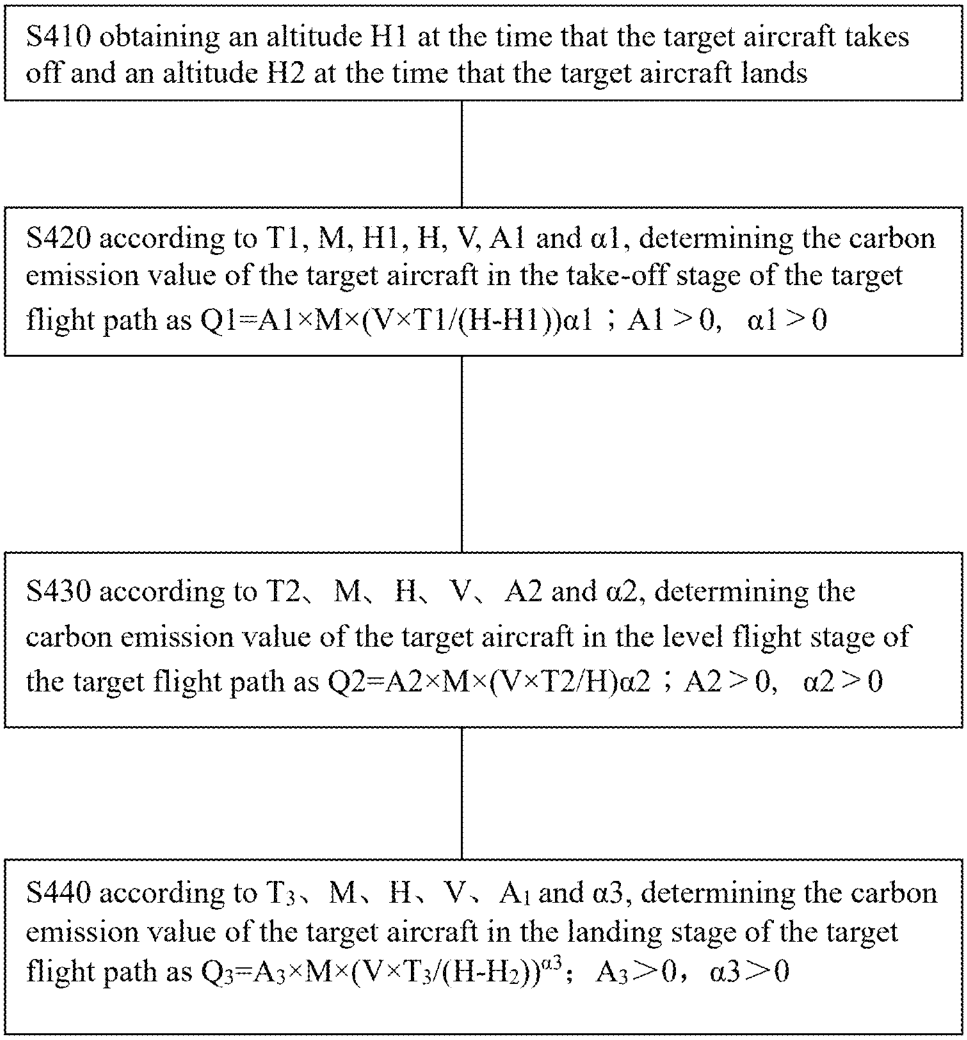
Figure 3A:
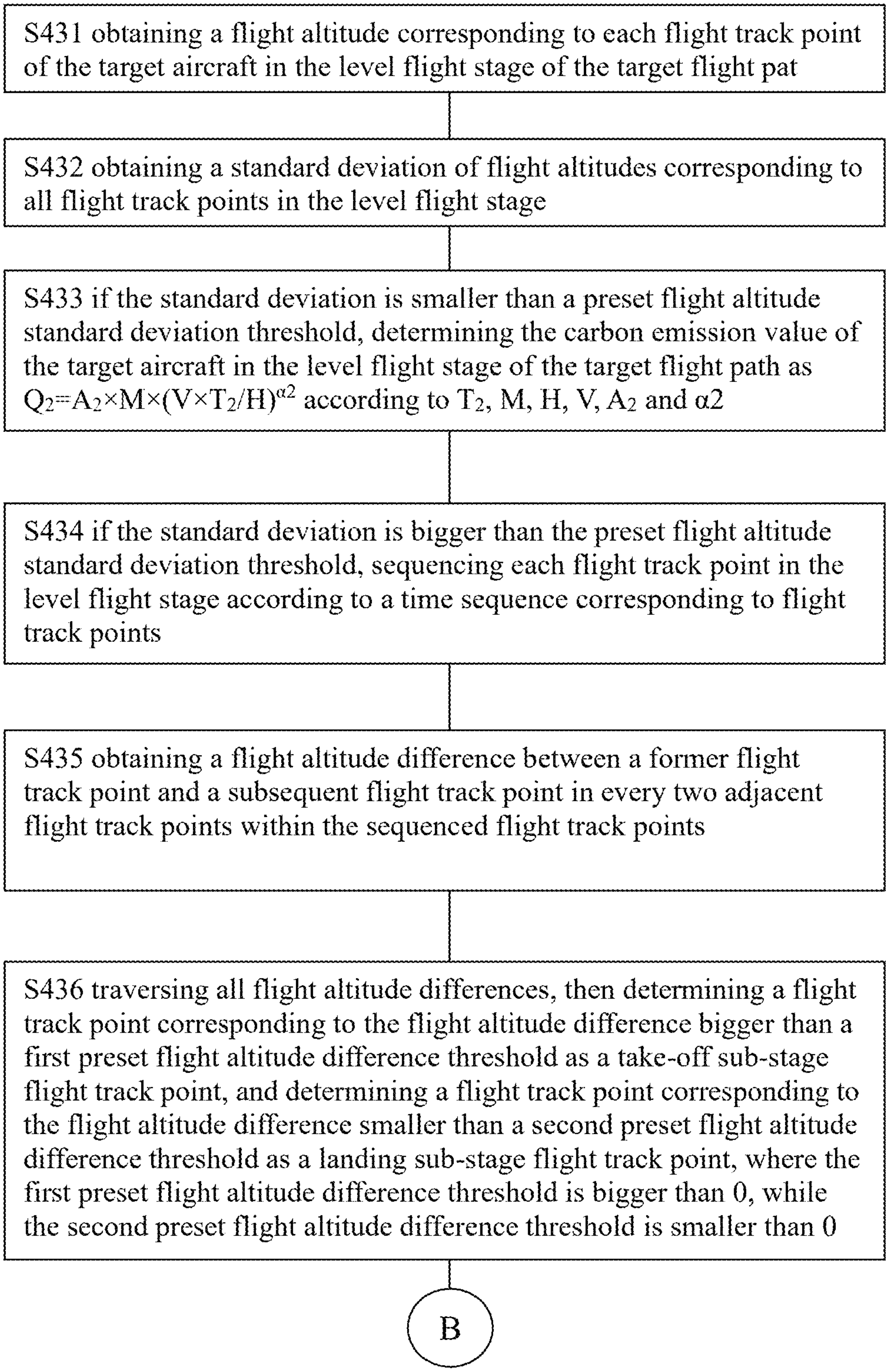
Figure 3B:
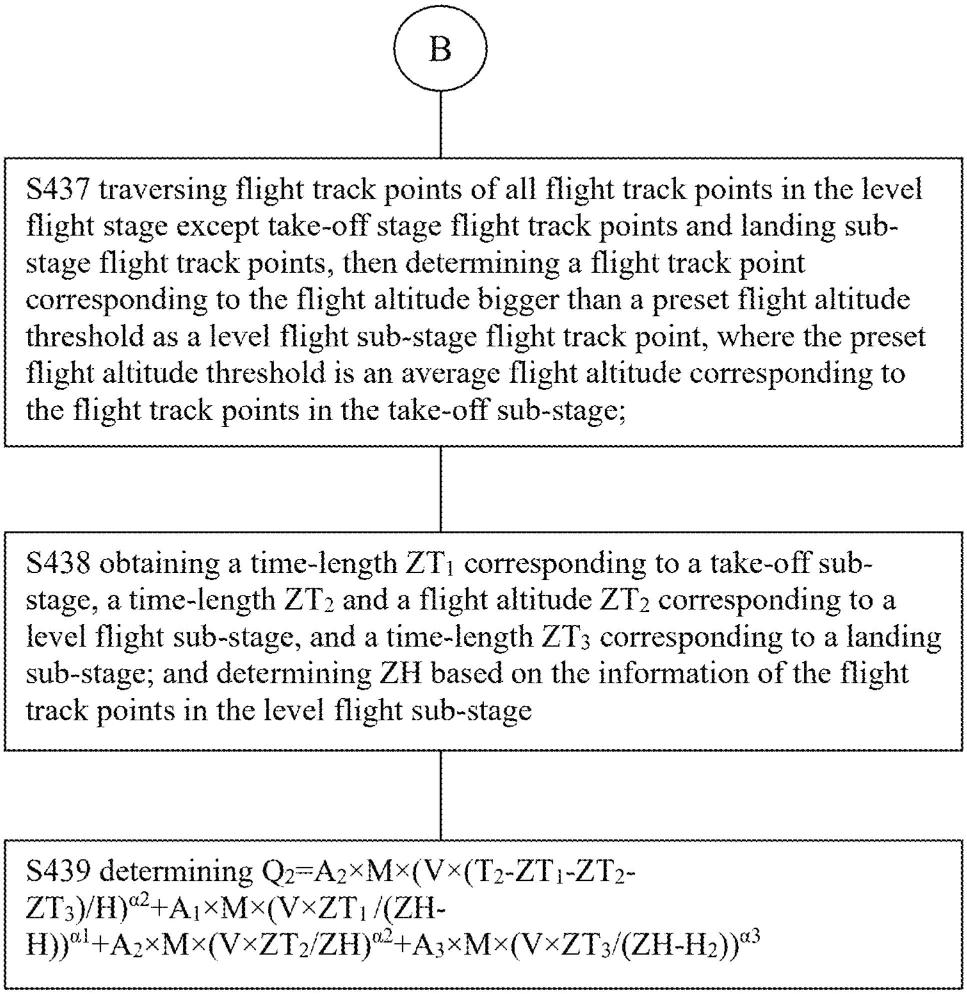

With reference to FIGS. 1A, 1B, 2, 3A and 3B showing flow charts of the steps executed by the processor of the system for determining a carbon emission value of a target aircraft, we shall describe a system for determining a carbon emission value of a target aircraft.

The system for determining a carbon emission value of a target aircraft comprises a processor and a storage medium, wherein the storage medium stores at least one instruction or at least a segment of program, which is processed by the processor, and executes the following steps.

S100 Obtaining a target flight path, defined as any past flight path corresponding to a target aircraft.

In this embodiment, the target aircraft may be any civil aircraft, the target aircraft corresponds to a plurality of flight paths in a preset past time-length, and the target flight path is any one of several flight paths. For example, the target flight path is a flight path corresponding to a certain type of aircraft flying from site 1 to site 2 at a specific time. It is understandable that the flight paths corresponding to different aircrafts flying from site 1 to site 2 may be different.

S200 Obtaining a flight time-length T of the target aircraft on the target flight path, a take-off weight M of the target aircraft, and a flight altitude H and a flight speed V of the target aircraft in a level flight stage of the target flight path.

In this embodiment, by way of using the ADS-B data generated by the target aircraft flying along the target flight path, it is possible to obtain information such as the flight time-length T, the flight altitude H and the flight speed; by way of using the flight parameters of the target aircraft, it is possible to directly determine the take-off weight M of the target aircraft; the flight altitude is an altitude, which may be an average flight altitude of the target aircraft in the level flight stage; the flight speed may be an average flight speed in the level flight stage.

S300 According to the type of the target aircraft, determining a carbon emission calculation weight corresponding to the target aircraft from a preset carbon emission calculation weight mapping table, which includes different several types of aircrafts and carbon emission calculation weights corresponding to each type of aircrafts.

In this embodiment, it is configured to preset a carbon emission calculation weight mapping table, which contains different several types of aircrafts, each of which correspondingly has a carbon emission calculation weight; the carbon emission calculation weight corresponding to the target aircraft may include a first carbon emission calculation weight B and a second carbon emission calculation weight β.

In this embodiment, the first carbon emission calculation weight B and the second carbon emission calculation weight β may be obtained by way of the following steps.

S310 Determining the relation between the carbon emission value of the target aircraft and the flight time-length T of the target aircraft flying along the target flight path, the take-off weight M of the target aircraft, the flight altitude H and the flight speed V of the target aircraft in the level flight stage of the target flight path, that is, $Q=x\times M\times(V\times T/H)^y$; where, Q is a carbon emission value corresponding to the target aircraft flying along a flight path, and x and y are a calculation weight.

S320 Obtaining flight parameters corresponding to each flight path in several past flight paths along which the target aircraft flies, including the flight time-length of the target aircraft flying along a corresponding target flight path, the take-off weight of the target aircraft, the flight altitude and the flight speed of the target aircraft in the level flight stage of the target flight path.

S330 On the base of $Q=x\times M\times(V\times T/H)^y$ and the flight parameters obtained in S320, solving the equation to obtain the values of x and y, that is, the first carbon emission calculation weight B=x and the second carbon emission calculation weight β=y corresponding to the target aircraft.

At the time of solving the equation, it is possible to calculate the logarithm of $Q=x\times M\times(V\times T/H)^y$, and then solve the linear equation and determine x and y by way of combining the least squares method.

In this embodiment, the derivation principle of $Q=x\times M\times(V\times T/H)^y$ is as follows.

It is understandable that if an aircraft is in a level flight stage, the carbon emission value of the aircraft are mainly related to the weight of the aircraft M, a series of parameters of the aircraft μ, the flight altitude H, the flight speed V and the flight time T; therefore, it is possible to establish a functional relation between the carbon emission value and the above parameters, Q=f (M, μ, H, V, T); for a fixed type of aircrafts, u can be excluded as Q=f (M, H, V, T).

Based on the above relation, make further analysis as flows. If $Q=x\times M^{b1}\times H^{b2}\times V^{b3}\times T^{b4}$, by way of dimensional analysis, make further conversion, as Q in kg, x as a coefficient, no dimension, M in kg, H in m, V in m/s, and T in s, and then give a dimensional relation $kg=(kg)^{b1}\times(m)^{b2}\times(m)^{b3}\times(s)^{-b3+b4}$; further give b1=1, b2=−b3=−b4; provide y=b2=−b3=−b4, give a relation $Q=x\times M\times(V\times T/H)^y$.

S400 If a computing capacity of a target device, which is used to calculate carbon emission values generated by the target aircraft flying along the target flight path, is bigger than a preset computing capacity threshold, determining a carbon emission value $Q_1$ in a take-off stage, a carbon emission value $Q_2$ in a level flight stage and a carbon emission value $Q_3$ in a landing stage of the target aircraft on the target flight path according to T, M, H, V and calculation weights corresponding to the target aircraft.

In this embodiment, $Q=B\times M\times(V\times T/H)^{\beta}$; $\beta>0$; it is understandable that the larger the take-off weight, the higher the speed and the longer the flight time of the target aircraft, the more fuel is consumed, and correspondingly, the bigger the carbon emission value corresponding to the target aircraft; the higher the flight altitude of the target aircraft, the smaller the wind resistance during the flight, the higher the engine efficiency, and correspondingly, the smaller the carbon emission value corresponding to the target aircraft; such a relation conforms to the above formula.

In this embodiment, it is possible to first obtain the computing capacity of the target device for calculating carbon emission values, if the computing capacity of the target device is bigger than a preset computing capacity threshold, execute a more accurate carbon emission calculation method, that is, divide the entire flight process into a take-off stage, a level flight stage and a landing stage, then calculate a carbon emission value of each stage separately.

Furthermore, the carbon emission calculation weight corresponding to the target aircraft may include a first carbon emission calculation weight B and a second carbon emission calculation weight β. The following step is further included between S400 and S500.

S401 If the computing capacity of the target device is smaller than or equal to a preset computing capacity threshold, determining $Q=B\times M\times(V\times T/H)^{\beta}$ and $\beta>0$ according to T, M, H, V, B, and β.

In this embodiment, if the computing capacity of the target device is smaller than or equal to the preset computing capacity threshold, the flight process of the target aircraft may be regarded as an overall flight process to calculate a carbon emission value; therefore, the calculation process is relatively simple and the calculation efficiency is higher. However, in the case of a relatively short flight distance, there will be two stages during the flight of the target aircraft, namely a take-off stage and a landing stage; in the case of a long flight distance, there will be a take-off stage, a level flight stage and a landing stage; in different stages, the fuel consumption rate of the target aircraft is different, that is, the fuel consumption rate in the take-off stage is bigger than that in the level flight stage and the landing stage; therefore, the carbon emission calculation weights corresponding to different fuel consumption rates should be different.

Furthermore, based on the above, in order to improve the accuracy of calculating carbon emission values for aircrafts, the following steps are further included between S200 and S300.

S210 Dividing the target flight path into a take-off stage, a level flight stage and a landing stage according to past flight information of the target aircraft on the target flight path.

In this embodiment, flight track points corresponding to boundary points between a take-off stage and a level flight stage, and flight track points corresponding to boundary points between a level flight stage and a landing stage can be determined on the base of a flight track formed by each flight track point corresponding to the target aircraft on the target flight path, and then divide the target flight path into the take-off stage, the level flight stage and the landing stage.

S220 Obtaining a flight time-length $T_1$ of the target aircraft in the take-off stage, a flight time-length $T_2$ in the level flight stage and a flight time-length $T_3$ in the landing stage, then summing them as $T_1+T_2+T_3=T$.

In this embodiment, on the base of a take-off time point $t_0$ and a landing time point $t_1$ corresponding to the target aircraft, a time point $t_2$ corresponding to a flight track point corresponding to a boundary point between the take-off stage and the level flight stage, and a time point $t_3$ corresponding to a flight track point corresponding to a boundary point between the level flight stage and the landing stage, it is possible to determine $T_1=t_2-t_0$; $T_2=t_3-t_2$; $T_3=t_1-t_3$.

Furthermore, S300 includes the following step.

S310 According to the type of the target aircraft, determining a third carbon emission calculation weight $A_1$ and a fourth carbon emission calculation weight α1 corresponding to the target aircraft in the take-off stage, a fifth carbon emission calculation weight $A_2$ and a sixth carbon emission calculation weight α2 corresponding to the target aircraft in the level flight stage, and a seventh carbon emission calculation weight $A_3$ and a eighth carbon emission calculation weight α3 corresponding to the target aircraft in the landing stage from the preset carbon emission calculation weight mapping table.

In this embodiment, after the flight process of the target aircraft is divided into the take-off stage, the level flight stage and the landing stage, the take off stage, the level flight stage and the landing stage correspond to a set of carbon emission calculation weights, respectively. It is possible to determine the carbon emission calculation weights of the take-off stage, the level flight stage and the landing stage corresponding to different types of aircrafts, respectively, by way of using methods in S310-S330, so as to obtain the carbon emission calculation weight mapping table in this embodiment.

Furthermore, S400 includes the following steps.

S410 Obtaining an altitude H1 at the time that the target aircraft takes off and an altitude H2 at the time that the target aircraft lands.

S420 According to $T_1$、M、H1、H、V、$A_1$ and α1, determining the carbon emission value of the target aircraft in the take-off stage of the target flight path as $Q_1=A_1\times M\times(V\times T_1/(H-H_1))^{\alpha 1}$; $A_1>0$, $\alpha 1>0$.

S430 According to $T_2$、M、H、V、$A_2$ and α2, determining the carbon emission value of the target aircraft in the level flight stage of the target flight path as $Q_2=A_2\times M\times(V\times T_2/H)^{\alpha 2}$, $A_2>0$, $\alpha 2>0$.

S440 According to $T_3$、M、H、V、$A_1$ and α3, determining the carbon emission value of the target aircraft in the landing stage of the target flight path as $Q_3=A_3\times M\times(V\times T_3/(H-H_2))^{\alpha 3}$; $A_3>0$, $\alpha 3>0$.

Furthermore, S430 includes the following steps.

S431 Obtaining a flight altitude corresponding to each flight track point of the target aircraft in the level flight stage of the target flight path.

S432 Obtaining a standard deviation of flight altitudes corresponding to all flight track points in the level flight stage.

S433 If the standard deviation is smaller than a preset flight altitude standard deviation threshold, determining the carbon emission value of the target aircraft in the level flight stage of the target flight path as $Q_2=A_2\times M\times(V\times T_2/H)^{\alpha 2}$ according to $T_2$、M、H、V、$A_2$ and α2.

In this embodiment, the target aircraft will encounter obstructions in the level flight stage, such as a cluster of clouds. In this case, it is usually necessary for the target aircraft to first take off to an altitude higher than the highest point of the obstruction, then fly horizontally over the obstruction, and finally descend to the flight altitude before take-off. When the target aircraft is taking off, the flight altitude will change greatly; if there is no occurrence to avoid obstructions, the flight altitude will not change sharply. Therefore, if the standard deviation of the flight altitudes corresponding to all flight track points in the level flight stage is smaller than a preset flight altitude standard deviation threshold, it is determined that there is no occurrence for the target aircraft to avoid obstructions, and $Q_2$ can be determined according to $T_2$, M, H, V, $A_2$ and $\alpha 2$.

Furthermore, the following steps are included after S433.

S434 If the standard deviation is bigger than the preset flight altitude standard deviation threshold, sequencing each flight track point in the level flight stage according to a time sequence corresponding to flight track points.

In this embodiment, if the standard deviation is bigger than the preset flight altitude standard deviation threshold, it indicates an occurrence for the target aircraft to avoid obstructions in the level flight stage; in this case, it is possible to sequence the flight track points according to the time of each flight track point corresponding to the level flight stage.

S435 Obtaining a flight altitude difference between a former flight track point and a subsequent flight track point in every two adjacent flight track points within the sequenced flight track points.

S436 Traversing all flight altitude differences, then determining a flight track point corresponding to the flight altitude difference bigger than a first preset flight altitude difference threshold as a take-off sub-stage flight track point, and determining a flight track point corresponding to the flight altitude difference smaller than a second preset flight altitude difference threshold as a landing sub-stage flight track point, where the first preset flight altitude difference threshold is bigger than 0, while the second preset flight altitude difference threshold is smaller than 0.

S437 Traversing flight track points of all flight track points in the level flight stage except take-off stage flight track points and landing sub-stage flight track points, then determining a flight track point corresponding to the flight altitude bigger than a preset flight altitude threshold as a level flight sub-stage flight track point, where the preset flight altitude threshold is an average flight altitude corresponding to the flight track points in the take-off sub-stage.

In this embodiment, in the level flight stage of the target aircraft, a flight altitude difference between a former flight track point and a subsequent flight track point in the sequenced flight track points is close to 0; in the take-off stage, the flight altitudes increase constantly, therefore, the corresponding flight altitude difference is quite big; in the landing stage, the flight altitudes decrease constantly, therefore, the corresponding flight altitude difference is negative; the flight altitude of the track points corresponding to the level flight sub-stage is quite big; based on the above characteristics, it is possible to determine the track points corresponding to the take-off sub-stage, the landing sub-stage and the level flight sub-stage corresponding to the level flight stage.

S438 Obtaining a time-length $ZT_1$ corresponding to a take-off sub-stage, a time-length $ZT_2$ and a flight altitude $ZT_2$ corresponding to a level flight sub-stage, and a time-length $ZT_3$ corresponding to a landing sub-stage; and determining ZH based on the information of the flight track points in the level flight sub-stage.

In this embodiment, after determining the flight track points corresponding to each sub-stage, it is possible to determine $ZT_1$, $ZT_2$, ZH and $ZT_3$ according to the time points and the flight altitudes corresponding to each flight track point; ZH may be an average flight altitude corresponding to each flight track point in the level flight sub-stage.

S439 Determining $Q_2=A_2\times M\times(V\times(T_2-ZT_1-ZT_2-ZT_3)/H)^{\alpha 2}+A_1\times M\times(V\times ZT_1/(ZH-H))^{\alpha 1}+A_2\times M\times(V\times ZT_2/ZH)^{\alpha 2}+A_3\times M\times(V\times ZT_3/(ZH-H_2))^{\alpha 3}$.

In this embodiment, because there is an occurrence for the target aircraft to avoid obstructions in the level flight stage, the time-length of the level flight stage is $T_2-ZT_1-ZT_2-ZT_3$, and then it is possible to determine the carbon emission value of the target aircraft in the level flight stage except for avoiding obstructions. $A_1\times M\times(V\times ZT_1/(ZH-H))^{\alpha 1}+A_2\times M\times(V\times ZT_2/ZH)^{\alpha 2}+A_3\times M\times(V\times ZT_3/(ZH-H_2))^{\alpha 3}$ stands for a carbon emission value corresponding to the target aircraft avoiding obstructions; since the carbon emission value corresponding to the target aircraft avoiding obstructions is calculated separately, the determined carbon emission value is more accurate.

S500 On the base of $Q_1$, $Q_2$ and $Q_3$, determining a carbon emission value $Q=Q_1+Q_2+Q_3$ corresponding to the target aircraft flying along the target flight path, Q being positively correlated with M, V and T, and negatively correlated with H.

In this embodiment, after determining the carbon emission calculation weights respectively corresponding to the take-off stage, the level flight stage and the landing stage, it is possible to respectively determine the carbon emission values corresponding to the take-off stage, the level flight stage and the landing stage in combination with the flight parameters of the target aircraft in each stage, and then obtain Q. It is understandable that when the target aircraft flies in the same stage, its engine runs under the same operation condition, and the engine is different in operation conditions in different stages; therefore, this method can improve the accuracy of determining the carbon emission value of the target aircraft.

Furthermore, the following steps are further included before S100.

S010 Obtaining initial flight track point data corresponding to the target flight path.

S020 Identifying false track point data from the initial track point data to obtain target flight track point data.

In this embodiment, the aircraft may be a civil aircraft, and it is possible to obtain the initial flight track point data corresponding to the flight path of each aircraft flying along each route by means of the ADS-B system used by civil aviation; it is understandable that false flight track points may exist in the initial flight track points, and the false flight track points may be generated by electromagnetic interference or artificial means; therefore, the false flight data needs to be filtered out. It should be noted that a person skilled in the art can use existing false flight data filtering methods to identify false flight track points from the initial flight track points and filter the initial flight track points and these methods will not be repeated herein.

Furthermore, the following steps are further included after S500.

S600 Predicting a carbon emission value of each target aircraft in a future time-length based on a carbon emission value corresponding to each target aircraft in a preset time-length.

S700 Optimizing a flight of each target aircraft based on a carbon emission value of each target aircraft in a future time-length.

In this embodiment, after obtaining the carbon emission value corresponding to each target aircraft in a preset time-length, it is possible to predict a carbon emission value of each target aircraft in a future time-length by using a preset prediction model to optimize a flight of each target aircraft in a future time-length based on the prediction data, so that the carbon emission values of the target aircraft meet relevant requirements.

With respect to the system for determining a carbon emission value of a target aircraft provided by this embodiment, by way of obtaining a flight time-length T of the target aircraft on the target flight path, a take-off weight M of the target aircraft, and a flight altitude H and a flight speed V of the target aircraft in a level flight stage of the target flight path; and according to the type of the target aircraft, determining a carbon emission calculation weight corresponding to the target aircraft from a preset carbon emission calculation weight mapping table, it is possible to obtain the carbon emission value corresponding to the target aircraft flying along the target flight path. The present invention takes into overall consideration the flight time-length of the target aircraft flying along the target flight path, the take-off weight of the target aircraft, the flight altitude and the flight speed of the target aircraft in the level flight stage of the target flight path, at the time of determining the carbon emission value corresponding to the target aircraft flying along the target flight path. In addition, by way of using the carbon emission calculation weights corresponding to different types of aircrafts flying on the same route are different, it is possible to determine a more accurate carbon emission value corresponding to the target aircraft flying along the target flight path.

Furthermore, in the prior art, calculating the carbon emission value on the base of a fixed flight path needs to combine few factors, but gives an inaccurate result; while calculating the carbon emission value on the base of flight track points requires a bigger computing capacity. The method of the present invention consists in dividing the flight path into three stages for calculation, compared with the mode of calculating the carbon emission value on the base of a fixed flight path in the prior art, it can give a more accurate result, compared with the mode of calculating the carbon emission value on the base of flight track points, it requires a smaller computing capacity for calculating carbon emission values, therefore, on the basis of ensuring the accuracy of carbon emission calculation, the present invention has advantages of saving computing capacities and widening its use.

In addition, separately calculating the carbon emission value corresponding to the target aircraft avoiding obstructions makes the determined carbon emission value corresponding to the target aircraft flying along the target flight path more accurate.

Furthermore, although the steps of the method in the present invention are described in a particular order in the FIGURES, this does not require or imply that the steps must be performed in that particular order, or that it is possible to achieve a desired result only after all the steps shown must have been performed. In an additional or optional case, it is possible to omit certain steps, combine multiple steps into a single step to execute, and/or decompose a step into multiple steps to execute.

The embodiments of the present invention also provide a non-transient computer-readable storage medium, which may be configured in an electronic device to store at least one instruction or at least a program related to a method in an example for realizing the method, and the at least one instruction or the at least one program is processed and executed by a processor to realize the method provided in the aforementioned embodiments.

The program product may use any combination of one or more readable media, which may be either readable signal media or readable storage media. The readable storage media may be, for example, but not limited to electrical, magnetic, optical, electromagnetic, infrared, or semiconductor systems, devices, or parts, or any combination thereof. As more specific examples (a non-exhaustive list), the readable storage medias include electrical connections with one or more wires, portable disks, hard disks, random access memories (RAM), read-only memories (ROM), erasable programmable read-only memories (EPROM or flash), optical fibers, portable compact disk read-only memories (CD-ROM), optical storage parts, magnetic storage parts, or any suitable combination of the above.

The computer-readable signal medium may be a data signal contained in a baseband or transmitted as part of a carrier wave, which carries a readable program code. This transmitted data signal may be in many forms, including, but not limited to, electromagnetic signals, optical signals, or any suitable combination of the above. The readable signal medium may also be any readable medium other than the readable storage medium, the readable medium can send or transmit programs that are used by or in combination with an instruction execution system, device or part.

Program codes contained in the readable media may be transmitted via any appropriate medium, including, but not limited to, means such as wireless, wired, cable and RF, or any appropriate combination thereof.

Program codes for executing the present invention may be written by means of any combination of one or more programming languages, including object-oriented programming languages, such as Java and C, and also including conventional procedural programming languages, such as "C" language or similar programming languages. The program codes may be executed entirely or partially on a user's device, or executed as an independent software package, or executed partly on a user's computing device and partly on a remote computing device, or executed entirely on a remote computing device or server. In the case of involving a remote computing device, the remote computing device can be connected to a user's computing device through any kind of network, including a local area network (LAN) or a wide area network (WAN), or it can be connected to an external computing device (for example, using a service provided by an Internet service provider to connect it).

The embodiments of the present invention also provide an electronic device comprising a processor and a non-transient computer-readable storage medium.

The electronic device is only an example and should not pose any limitation on the embodiments of the present invention in terms of function and use.

The electronic device is represented in the form of general-purpose computing devices. The components of the electronic device may include, but not limited to: at least one processor as described above, at least one memory as described above, and buses connecting different system components (including memories and processors).

The memory stores program codes, which can be executed by the processor, so that the processor executes the steps in various embodiments described in the present invention.

The memory may be a readable media in the form of volatile memories, such as a random-access memory (RAM) and/or a cache memory, and further may be a read-only memory (ROM).

The memory may also include programs/utilities having a set (or at least one) of program modules, including, but not limited to, an operating system, one or more applications, other program modules and program data, each or a combination of these examples may be realized in a network environment.

The bus may be in the form of one or more of several types of bus structures, including memory buses or memory controllers, peripheral buses, graphics acceleration ports, processors, or local buses that use any of various bus structures.

The electronic device may also communicate with one or more external devices (for example, keyboards, pointing devices and Bluetooth devices), and communicate with one or more devices that enable users to interact with the electronic device, and/or with any device (for example, routers and modems) that enables the electronic device to communicate with one or more other computing devices. This communication can be done via input/output (I/O) interfaces. In addition, the electronic devices can communicate with one or more networks (for example, a local area network (LAN), a wide area networks (WAN) and/or a public network such as the Internet) via network adapters. The network adapter communicates with other modules of the electronic device via buses. It should be understood that, although not shown herein, other hardware and/or software modules may be used in combination with the electronic device, including, but not limited to, micro-codes, device drivers, redundancy processors, external disk driver arrays, RAID systems, tape drivers, and data backup storage systems.

Through the description of the above embodiments, it is easy for a person skilled in the art to understand, and the examples described herein can be realized by way of combining software with necessary hardware. Therefore, the technical solutions based on the embodiments of the present invention may be embodied in the form of a software product, which may be stored in a non-volatile storage medium (which may be a CD-ROM, a USB flash drive, a mobile hard disk, etc.) or a network, which includes a plurality of instructions to enable a computing device (which may be a personal computer, a server, a terminal device, or a network device, etc.) to execute the method based on the embodiments of the present invention.

The embodiments of the present invention also provide a computer program product comprising a program code. When the program product runs on an electronic device, the program code is used to enable the electronic device to execute the steps in the method described above herein according to various examples of the present invention.

Although some specific embodiments of the present invention have been described in detail through examples, a person skilled in the art should understand that the above examples are only used for description and not intended to pose any limitation on the scope of the present invention. A person skilled in the art should also understand that embodiments can be modified in a variety of ways without departing from the scope and essence of the present invention.

What is claimed is:

1. A system for determining a carbon emission value of a target aircraft comprising a processor and a storage medium, wherein the storage medium stores at least one instruction or at least a segment of program, which are processed and executed by the processor, so as to effectuate the steps of

S010 obtaining initial flight track point data corresponding to the target flight path; and

S020 identifying false track point data from the initial track point data to obtain target flight track point data;

S100 obtaining a target flight path, defined as any past flight path corresponding to a target aircraft;

S200 obtaining a flight time-length T of the target aircraft on the target flight path, a take-off weight M of the target aircraft, and a flight altitude H and a flight speed V of the target aircraft in a level flight stage of the target flight path;

S300 according to the type of the target aircraft, determining a carbon emission calculation weight corresponding to the target aircraft from a preset carbon emission calculation weight mapping table, which includes several different types of aircrafts and carbon emission calculation weights corresponding to each type of aircrafts;

S400 if a computing capacity of a target device, which is used to calculate carbon emission values generated by the target aircraft flying along the target flight path, is bigger than a preset computing capacity threshold, determining a carbon emission value $Q_1$ in a take-off stage, a carbon emission value $Q_2$ in a level flight stage and a carbon emission value $Q_3$ in a landing stage of the target aircraft on the target flight path according to T, M, H, V and calculation weights corresponding to the target aircraft; and

S500 on the base of $Q_1$, $Q_2$ and $Q_3$, determining a carbon emission value $Q=Q_1+Q_2+Q_3$ corresponding to the target aircraft flying along the target flight path, Q being positively correlated with M, V and T, and negatively correlated with H,

S600 predicting a carbon emission value of each target aircraft in a future time-length based on a carbon emission value corresponding to each target aircraft in a preset time-length; and

S700 optimizing a flight of each target aircraft based on a carbon emission value of each target aircraft in a future time-length, wherein the carbon emission calculation weight corresponding to the target aircraft includes a first carbon emission calculation weight B and a second carbon emission calculation weight $\beta$;

said at least instruction or said at least a segment of program further effectuate the following step between S400 and S500.

2. The system for determining a carbon emission value of a target aircraft according to claim 1, wherein the following steps between S200 and S300:

S210 dividing the target flight path into a take-off stage, a level flight stage and a landing stage according to past flight information of the target aircraft on the target flight path; and

S220 obtaining a flight time-length $T_1$ of the target aircraft in the take-off stage, a flight time-length $T_2$ in the level flight stage and a flight time-length $T_3$ in the landing stage, then summing them as $T_1+T_2+T_3=T$;

S300 includes the step of S310 according to the type of the target aircraft, determining a third carbon emission calculation weight $A_1$ and a fourth carbon emission calculation weight $\alpha 1$ corresponding to the target aircraft in the take-off stage, a fifth carbon emission calculation weight $A_2$ and a sixth carbon emission calculation weight $\alpha 2$ corresponding to the target aircraft in the level flight stage, and a seventh carbon emission calculation weight $A_3$ and a eighth carbon emission calculation weight $\alpha 3$ corresponding to the target aircraft in the landing stage from the preset carbon emission calculation weight mapping table.

3. The system for determining a carbon emission value of a target aircraft according to claim 2, wherein $Q_1$, $Q_2$ and $Q_3$ are determined by the steps of

S410 obtaining an altitude H1 at the time that the target aircraft takes off and an altitude H2 at the time that the target aircraft lands;

S420 according to $T_1$, M, $H_1$, H, V, $A_1$ and $\alpha 1$, determining the carbon emission value of the target aircraft in the take-off stage of the target flight path as $Q_1=A_1\times M\times(V\times T_1/(H-H_1))^{\alpha 1}$; $A_1>0$, $\alpha 1>0$;

S430 according to $T_2$, M, H, V, $A_2$ and $\alpha 2$, determining the carbon emission value of the target aircraft in the level flight stage of the target flight path as $Q_2=A_2\times M\times(V\times T_2/H)^{\alpha 2}$; $A_2>0$, $\alpha 2>0$; and

S440 according to $T_3$, M, H, $A_1$ and $\alpha 3$, determining the carbon emission value of the target aircraft in the landing stage of the target flight path as $Q_3=A_3\times M\times(V\times T_3/(H-H_2))^{\alpha 3}$; $A_3>0$, $\alpha 3>0$.

4. The system for determining a carbon emission value of a target aircraft according to claim 3, wherein S430 includes the steps of

S431 obtaining a flight altitude corresponding to each flight track point of the target aircraft in the level flight stage of the target flight path;

S432 obtaining a standard deviation of flight altitudes corresponding to all flight track points in the level flight stage; and

S433 if the standard deviation is smaller than a preset flight altitude standard deviation threshold, determining the carbon emission value of the target aircraft in the level flight stage of the target flight path as $Q_2=A_2\times M\times(V\times T_2/H)^{\alpha 2}$ according to $T_2$, M, H, V, $A_2$ and $\alpha 2$.

5. The system for determining a carbon emission value of a target aircraft according to claim 4, wherein the following steps are included after S433:

S434 if the standard deviation is bigger than the preset flight altitude standard deviation threshold, sequencing each flight track point in the level flight stage according to a time sequence corresponding to flight track points;

S435 obtaining a flight altitude difference between a former flight track point and a subsequent flight track point in every two adjacent flight track points within the sequenced flight track points;

S436 traversing all flight altitude differences, then determining a flight track point corresponding to the flight altitude difference bigger than a first preset flight altitude difference threshold as a take-off sub-stage flight track point, and determining a flight track point corresponding to the flight altitude difference smaller than a second preset flight altitude difference threshold as a landing sub-stage flight track point, where the first preset flight altitude difference threshold is bigger than 0, while the second preset flight altitude difference threshold is smaller than 0;

S437 traversing flight track points of all flight track points in the level flight stage except take-off stage flight track points and landing sub-stage flight track points, then determining a flight track point corresponding to the flight altitude bigger than a preset flight altitude threshold as a level flight sub-stage flight track point, where the preset flight altitude threshold is an average flight altitude corresponding to the flight track points in the take-off sub-stage;

S438 obtaining a time-length $ZT_1$ corresponding to a take-off sub-stage, a time-length $ZT_2$ and a flight altitude $ZT_2$ corresponding to a level flight sub-stage, and a time-length $ZT_3$ corresponding to a landing sub-stage; and determining ZH based on the information of the flight track points in the level flight sub-stage; and

S439 determining $Q_2=A_2\times M\times(V\times(T_2-ZT_1-ZT_2-ZT_3)/H)^{\alpha 2}+A_1\times M\times(V\times ZT_1/(ZH-H))^{\alpha 1}+A_2\times M\times(V\times ZT_2/ZH)^{\alpha 2}+A_3\times M\times(V\times ZT_3/(ZH-H_2))^{\alpha 3}$.

6. The system for determining a carbon emission value of a target aircraft according to claim 1, wherein the flight altitude H is an altitude and determined by an altitude of a flight track point corresponding to the target flight path.

7. The system for determining a carbon emission value of a target aircraft according to claim 1, if the computing capacity of the target device is smaller than or equal to a preset computing capacity threshold, determining $Q=B\times M\times(V\times T/H)^{\beta}$ according to T, M, H, V, B, and $\beta$, where $\beta>0$.

* * * * *